(12) United States Patent
Yim et al.

(10) Patent No.: US 10,817,366 B2
(45) Date of Patent: Oct. 27, 2020

(54) METHOD AND APPARATUS FOR TRACING COMMON CAUSE FAILURE IN INTEGRATED DRAWING

(71) Applicant: KEPCO ENGINEERING & CONSTRUCTION COMPANY, INC., Gyeongsangbuk-do (KR)

(72) Inventors: Ho Bin Yim, Daejeon (KR); Jae Young Huh, Daejeon (KR); Gyu Cheon Lee, Daejeon (KR)

(73) Assignee: KEPCO ENGINEERING & CONSTRUCTION COMPANY, INC., Gyeongsangbuk-do (KR)

( * ) Notice: Subject to any disclaimer, the term of this patent is extended or adjusted under 35 U.S.C. 154(b) by 0 days.

(21) Appl. No.: 16/414,662

(22) Filed: May 16, 2019

(65) Prior Publication Data
US 2019/0354459 A1    Nov. 21, 2019

(30) Foreign Application Priority Data

May 16, 2018  (KR) .................. 10-2018-0056177
Sep. 20, 2018  (KR) .................. 10-2018-0113279

(51) Int. Cl.
| | |
|---|---|
| *G06F 11/07* | (2006.01) |
| *G06F 11/32* | (2006.01) |
| *G06F 11/34* | (2006.01) |
| *G06K 9/32* | (2006.01) |
| *G06F 16/901* | (2019.01) |

(52) U.S. Cl.
CPC .......... *G06F 11/079* (2013.01); *G06F 11/323* (2013.01); *G06F 11/3461* (2013.01); *G06K 9/3241* (2013.01); *G06F 16/9027* (2019.01)

(58) Field of Classification Search
USPC .......................................... 716/106
See application file for complete search history.

(56) References Cited

U.S. PATENT DOCUMENTS

| | | | | |
|---|---|---|---|---|
| 5,548,715 A | * | 8/1996 | Maloney | ........ G01R 31/318342 714/28 |
| 9,417,626 B2 | | 8/2016 | Jones et al. | |
| 2015/0100928 A1 | * | 4/2015 | Saghizadeh | ............ G06F 30/30 716/102 |

FOREIGN PATENT DOCUMENTS

| | | |
|---|---|---|
| JP | 09-091327 A | 4/1997 |
| JP | 10-171861 A | 6/1998 |

(Continued)

OTHER PUBLICATIONS

Korean Intellectual Property Office, Notice of Allowance in Korean Patent Application No. 10-2018-0113279 dated Dec. 20, 2018, 2 pages, no English available.

*Primary Examiner* — Eric D Lee
(74) *Attorney, Agent, or Firm* — Schwabe, Williamson & Wyatt, P.C.

(57) ABSTRACT

Provided is a method of tracing a common cause failure in an integrated drawing. The method includes: synthesizing entities assigned attributes in at least one design drawing in units of a system where a common cause is to be traced; generating an integrated drawing with a hierarchical structure by horizontally or vertically interconnecting the entities assigned the same attribute in the at least one design drawing; and displaying a fault propagation path in the integrated drawing by using an internal tracer, wherein the displaying illustrates state information of the entities on the fault propagation path.

8 Claims, 12 Drawing Sheets

(56) References Cited

FOREIGN PATENT DOCUMENTS

| | | |
|---|---|---|
| JP | 2012-504291 A | 2/2012 |
| KR | 101734289 B1 | 5/2017 |

* cited by examiner

METHOD AND APPARATUS FOR TRACING COMMON CAUSE FAILURE IN INTEGRATED DRAWING

STATEMENT OF GOVERNMENT SUPPORT

This work was supported by the Korea Institute of Energy Technology Evaluation and Planning (KETEP) grant funded by the Korea Government (MOTIE) (20161510101840, Department of Design Extension Conditions Analysis and Management Technology for Prevention of Severe Accident).

CROSS-REFERENCE TO RELATED APPLICATIONS

This application claims the benefit of Korean Patent Application No. 10-2018-0056177, filed on May 16, 2018, in the Korean Intellectual Property Office, and Korean Patent Application No. 10-2018-0113279, filed on Sep. 20, 2018, in the Korean Intellectual Property Office, the disclosures of which are incorporated herein in their entirety by reference.

BACKGROUND

1. Field

One or more embodiments relate to a method of rapidly settling an accident through a stability analysis or accident cause tracing, and more particularly, to a method of detecting and analyzing a common cause failure in a nuclear power plant.

2. Description of the Related Art

Identification of a fault propagation path or a common cause failure, which may occur in a nuclear power plant, is manually performed by a person. For example, a manager personally and manually traces and identifies a design drawing, a fault tree diagram, and a block diagram related to a common cause failure. However, as a nuclear power plant system becomes increasingly complex, there is an increasing possibility of an error occurring while a manager manually identifies a common cause failure.

Also, in the case of a common cause failure tracing technology that was used in a nuclear power plant, because it is performed assuming that a particular device has failed in the process of designing or immediately after designing, only limited information is provided and thus there is no way to manage effectively when an analyzed device has failed.

Also, when a design drawing content is changed, deleted, and/or added, because a design drawing, a fault tree diagram, and a block diagram related to a common cause failure should all be traced and identified again, there is a great manpower loss.

RELATED ART DOCUMENT

Patent Document

KR 10-1734289 B1

SUMMARY

One or more embodiments include analyzing a common cause failure by automatically detecting entities affected by the common cause failure by using an integrated drawing.

One or more embodiments include a method of automatically tracing a fault propagation path, identifying the fault propagation path, and illustrating the availability and/or unavailability states of entities on the fault propagation path, by using an integrated drawing that is generated by hierarchically dividing drawings and then connecting them with the same attribute.

Additional aspects will be set forth in part in the description which follows and, in part, will be apparent from the description, or may be learned by practice of the presented embodiments.

According to one or more embodiments, a method of tracing a common cause failure in an integrated drawing includes: distinguishing shapes of entities in at least one design drawing and assigning an attribute to each of distinguished entities; synthesizing the entities assigned the attributes in the at least one design drawing in units of a system where a common cause is to be traced; generating an integrated drawing with a hierarchical structure by horizontally or vertically interconnecting the entities assigned the same attribute in the at least one design drawing; and displaying a fault propagation path in the integrated drawing by using an internal tracer, wherein the displaying illustrates state information of the entities on the fault propagation path.

The internal tracer may include state information of each entity in the integrated drawing, and the state information may represent an available state and an unavailable state.

The internal tracer may carry integer type information and true/false type information in the form of (i, B), operate a logic gate as true/false type information, and operate procedure progress and end as integer type information, the true/false type information may be represented by True (T) or False (F), the integer type information may be represented by i, the true/false type information may have F when i>0, and the true/false type information may have T when i≤0.

The internal tracer may be discharged to all terminals in the integrated drawing, and when a discharge terminal is an output terminal, a value of the integer type information may be increased by 1 and then the internal tracer may be transmitted to a next entity and a line where the internal tracer is transmitted may be blocked.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
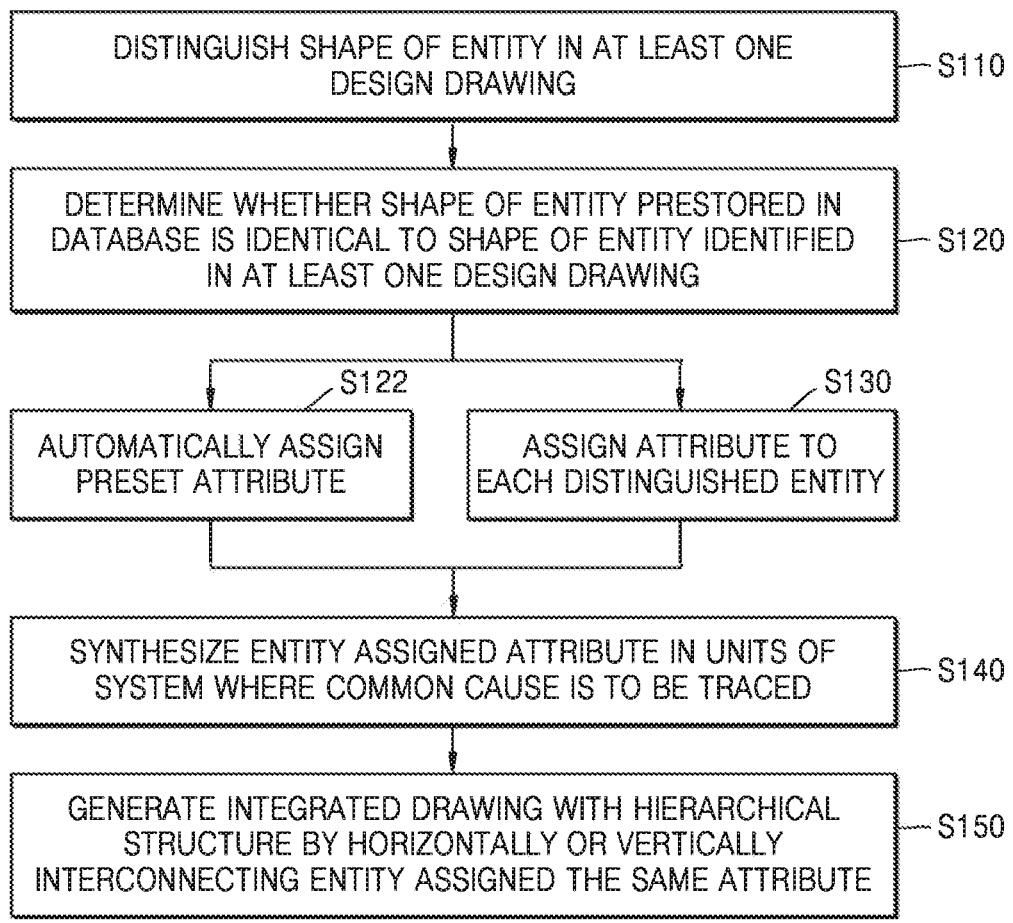
FIGS. 1, 2, and 7 illustrate a flowchart of integrated drawing production and an internal configuration diagram of an integrated drawing producing apparatus, as an example embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present disclosure will be described in detail with reference to the accompanying drawings so that those of ordinary skill in the art may easily implement the embodiments. However, the present disclosure may be embodied in various different forms and should not be construed as being limited to the embodiments described herein. Also, portions irrelevant to the description of the present disclosure will be omitted in the drawings for a clear description of the present disclosure, and like reference numerals will denote like elements throughout the specification.

Throughout the specification, when an element is referred to as being "connected" to another element, it may be "directly connected" to the other element or may be "electrically connected" to the other element with one or more intervening elements therebetween.

Typical techniques used for common cause failure analysis may be a fault tree diagram-based method and a block diagram-based method.

There is an automation tool in the case of a fault tree diagram; however, in order to use the automation tool, it may be necessary to represent a design document by the fault tree diagram, which may include an additional human error in the process of conversion thereof. Also, a fault tree diagram is produced when a probabilistic safety evaluation is performed for licensing; however, a software portion such as a control logic is not represented and it takes a considerable time to reflect any design change and thus there is a potential limitation in shape management.

Because a block diagram represents the function or position of a device in a simple block, the block diagram may detect a common cause failure faster than the fault tree diagram; however, because there are many portions omitted in block production, the block diagram is used to detect a rough fault propagation path. This may have a limitation in that it may be impossible to detect an accurate fault propagation path because the detailed content of an execution logic implemented in Digital I&C applied to the current nuclear power plant may not be represented.

An example embodiment of the present disclosure provides a method of detecting a device that may have a common cause failure, by automatically tracing a fault propagation path in an integrated drawing that is generated by hierarchically dividing drawings and then connecting them with the same attribute.

Figure 2:
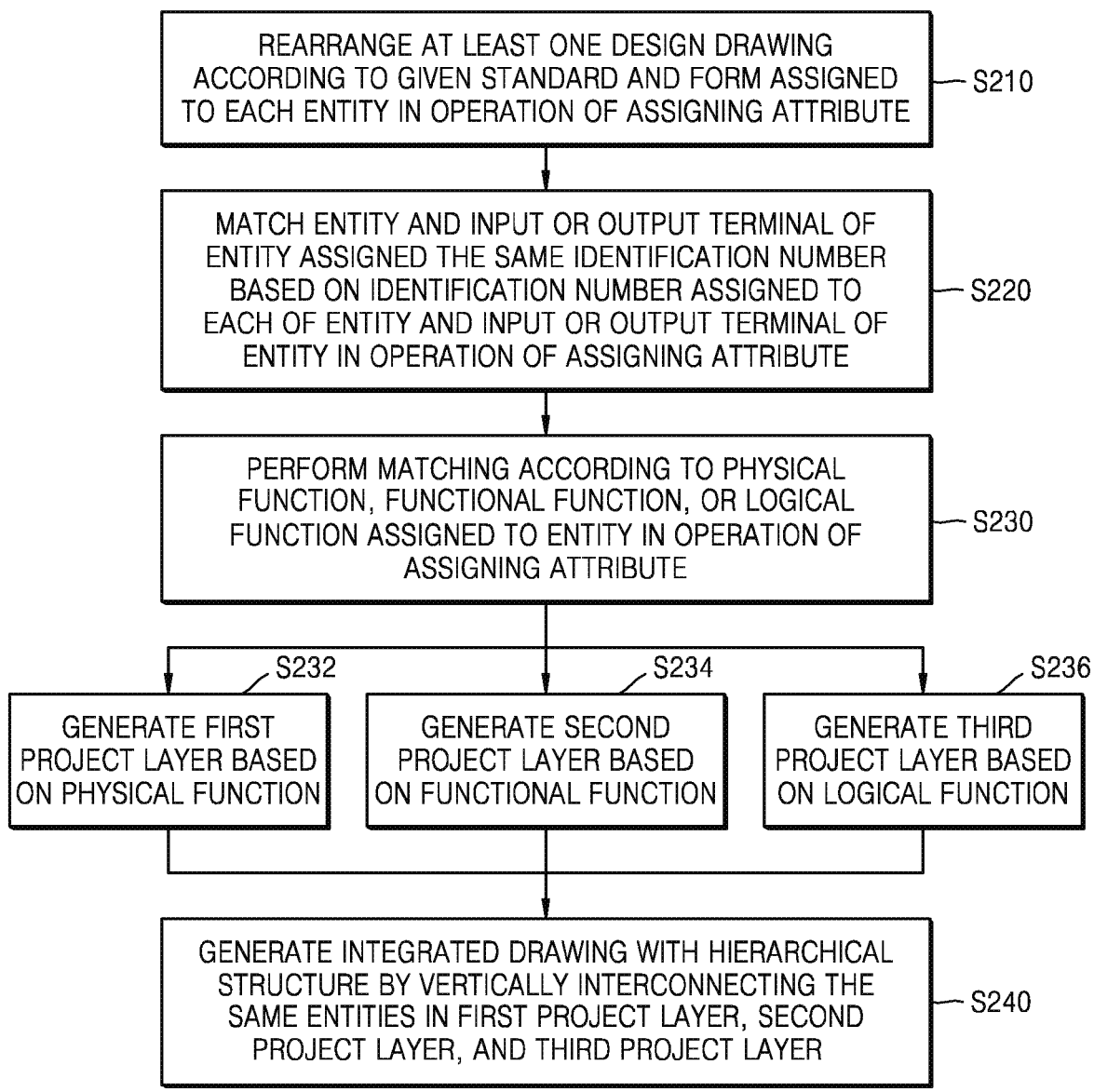
Figure 7:
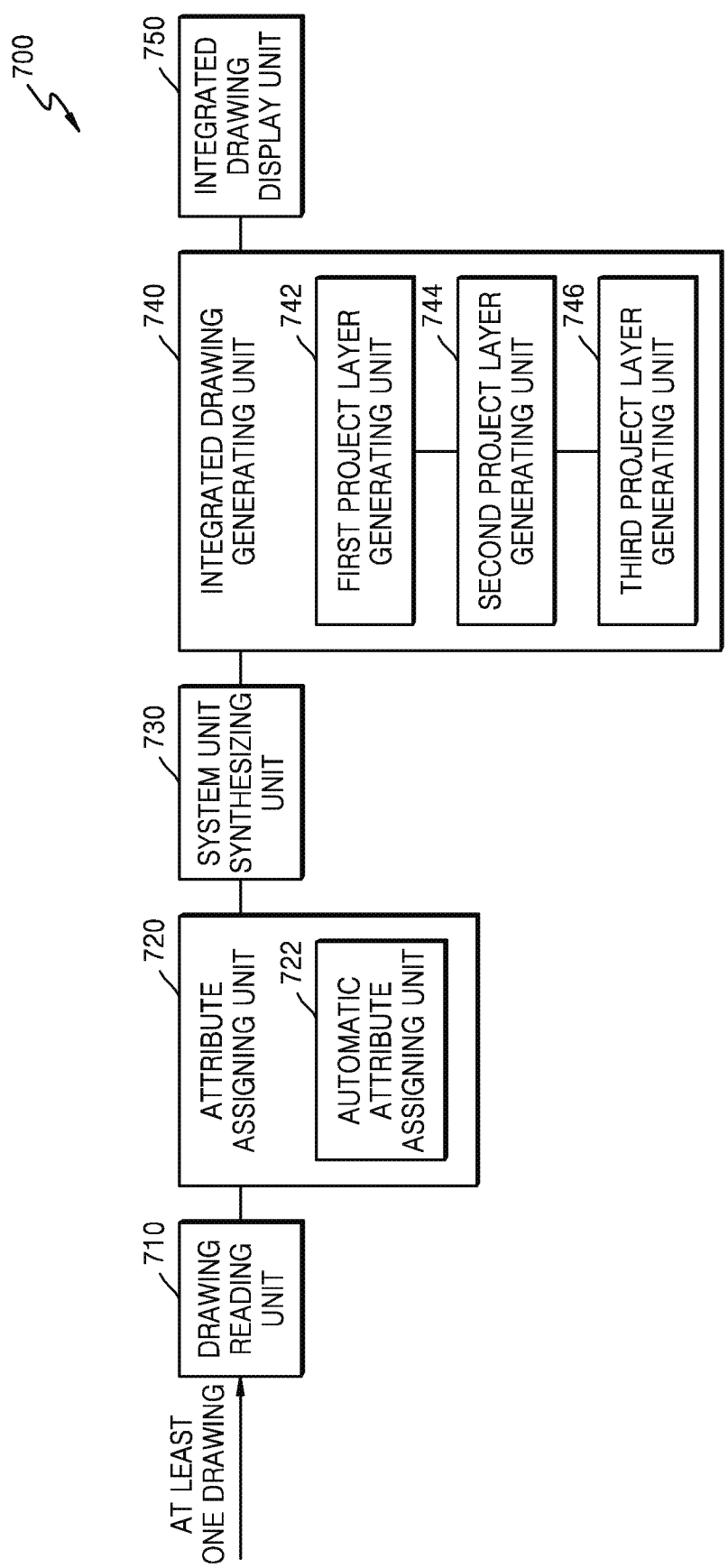

FIGS. 1, 2, and 7 illustrate a flowchart of integrated drawing production and an internal configuration diagram (700) of an integrated drawing producing apparatus, as an example embodiment of the present disclosure. A method of producing an integrated drawing in the integrated drawing producing apparatus will be described with reference to FIGS. 1, 2, and 7.

A drawing reading unit 710 may import or select at least one design drawing through an explorer to recognize entities in the design drawing (S110). An attribute assigning unit 720 may distinguish shapes of entities in at least one design drawing and assign an attribute to each of distinguishing entities. In this case, when the shape of an entity recognized by the drawing reading unit 710 is identical to the shape of an entity stored in a database (S120), an automatic attribute assigning unit 722 may automatically assign a preset attribute stored in a database to the relevant entity (S122).

The attribute assigning unit 720 may assign a given standard and form as an attribute to an entity when the shape of the entity recognized by the drawing reading unit 710 is not identical to the shape of the entity stored in the database and may also assign at least one of a physical attribute, a functional attribute, and a logical attribute thereto (S130). Also, the attribute assigning unit 720 may reconstruct the coordinates of entities in the design drawing, assign the results as attributes, and represent the relationship between entities by using a defined line "acr". Also, when each entity satisfies an internal tracing condition in the attribute assigning unit 720, it may be automatically assigned one of integer type information for performing an operation on the progress order and true/false type information for performing a logic operation according to satisfaction or dissatisfaction of the condition.

When all attributes are assigned to each of the entities detected in at least one design drawing, a system unit synthesizing unit 730 may synthesize the entities or at least one design drawing in units of a system where a common cause is to be traced (S140).

An integrated drawing generating unit 740 may generate an integrated drawing with a hierarchical structure by horizontally or vertically interconnecting the entities assigned the same attribute in at least one design drawing (S150). A method of generating an integrated drawing in the integrated drawing generating unit 740 will be described with reference to FIG. 2.

The integrated drawing generating unit 740 may rearrange each entity at a virtual coordinate according to an attribute such as a given standard or form assigned to each entity (S210). Thereafter, the attribute assigning unit 720 may match the entity and an input or output terminal of the entity assigned the same identification number based on an identifier assigned to the entity and the input or output terminal of the entity (S220). In this case, the integrated drawing generating unit 740 may generate a physical layer, a logical layer, or a functional layer according to a physical attribute, a logical attribute, or a functional attribute assigned to each entity (S230). For this purpose, the integrated drawing generating unit 740 may include a first project layer generating unit 742, a second project layer generating unit 744, and a third project layer generating unit 746.

The first project layer generating unit 742 may generate a first project layer as a physical layer based on a physical function assigned to each entity (S232). The second project layer generating unit 744 may generate a second project layer as a functional layer based on a functional function assigned to each entity (S234). Also, the third project layer generating unit 746 may generate a third project layer as a logical layer based on a logical function assigned to each entity (S236).

Thereafter, the integrated drawing generating unit 740 may arrange the entity at a virtual grid based on a virtual coordinate assigned to each entity read from at least one drawing by the attribute assigning unit 720 and vertically or hierarchically connect the corresponding same entities in the first project layer, the second project layer, and the third project layer to generate an integrated drawing (S240).

As another example embodiment of the present disclosure, an example of generating an integrated drawing will be described with reference to FIGS. 3A, 3B, 4, and 5.

Figure 3A:
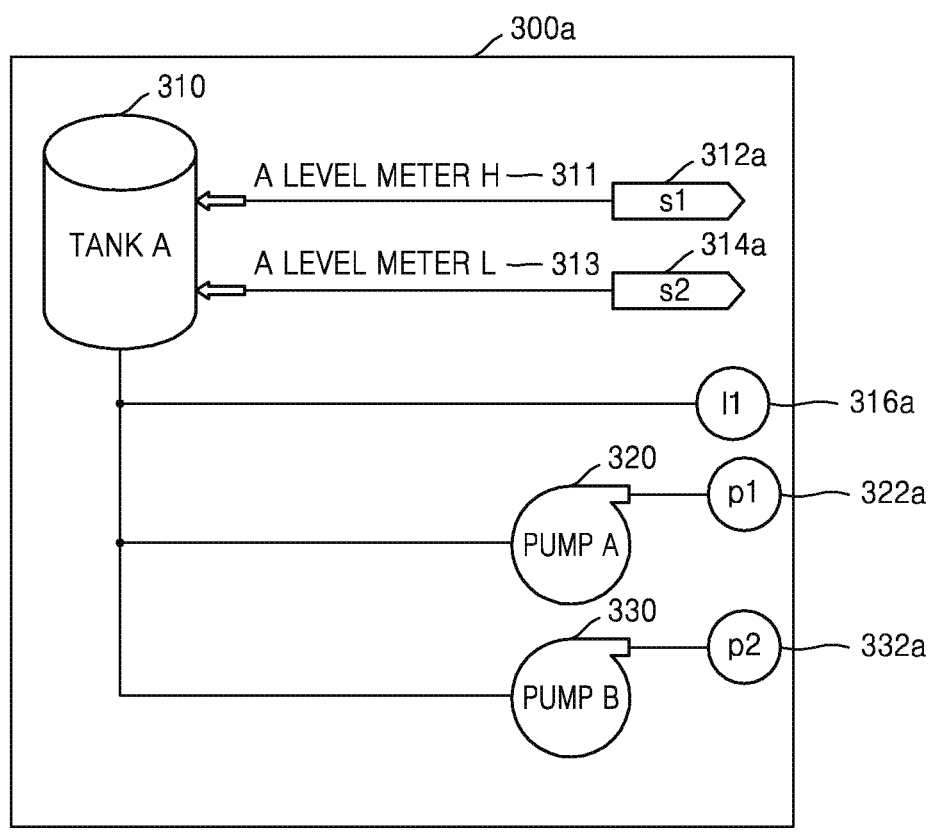
FIGS. 3A and 3B illustrate an embodiment of a design drawing where entities of a physical function are illustrated, as an example embodiment of the present disclosure.
Figure 3B:
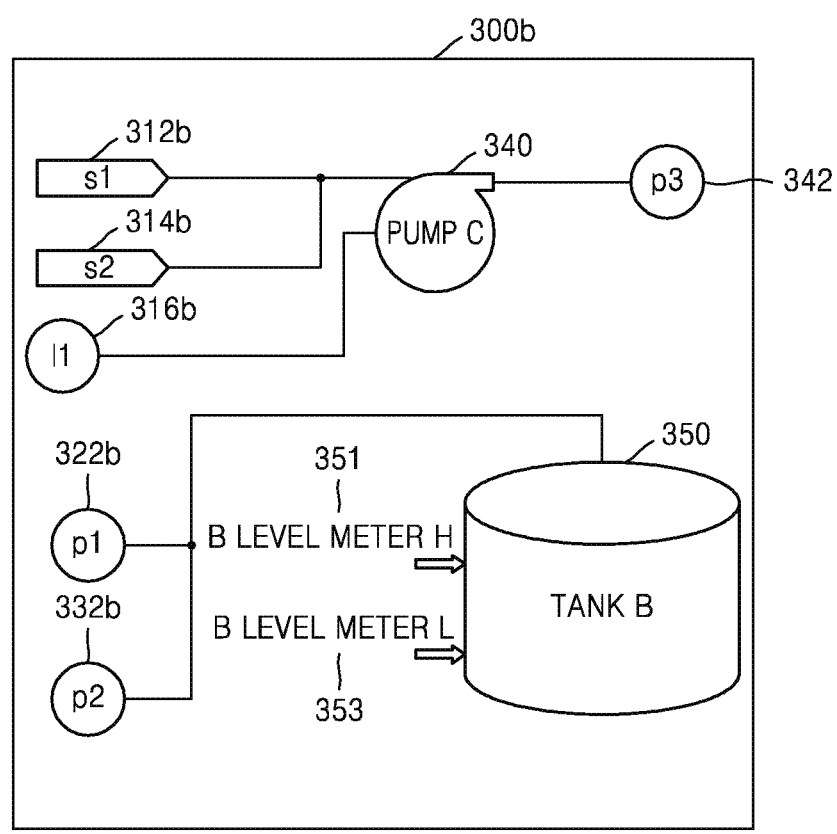
Figure 4:
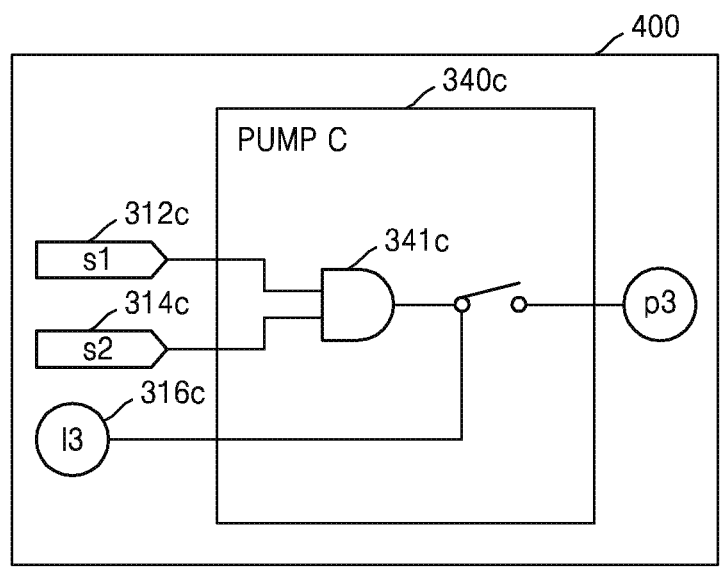
FIG. 4 illustrates an embodiment of a design drawing where entities of a logical function are illustrated, as an example embodiment of the present disclosure.
Figure 5:
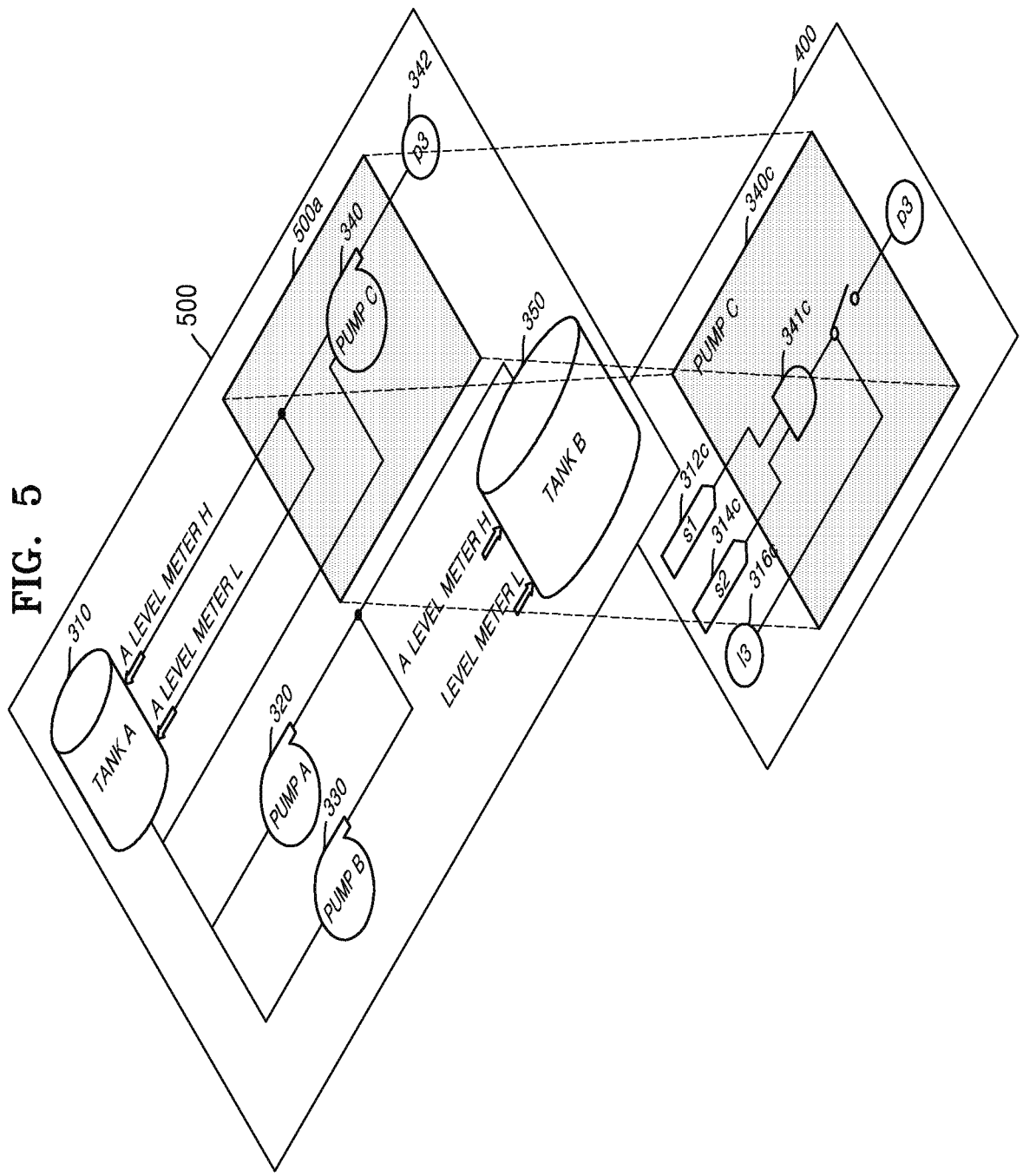
FIG. 5 illustrates an example of an integrated drawing generated based on FIGS. 3A, 3B, and 4, as an example embodiment of the present disclosure.

FIGS. 3A and 3B illustrate an embodiment of a design drawing where entities of a physical function are illustrated. FIG. 4 illustrates an embodiment of a design drawing where entities of a logical function are illustrated. FIG. 5 illustrates an example of an integrated drawing generated based on FIGS. 3A, 3B, and 4, as an example embodiment of the present disclosure.

In an example embodiment of the present disclosure, the drawing reading unit 710 (see FIG. 7) may read FIG. 3A (300a) and read a tank A 310, a pump A 320, a pump B 330, an A level meter H 311, and an A level meter L 313 as an entity. Likewise, the drawing reading unit 710 (see FIG. 7) may read FIG. 3B (300b) and read a pump C 340, a tank B 350, a B level meter H 351, and a B level meter L 353 as an entity. As an example embodiment of the present disclosure, the entities may include devices, circuits, and elements having independent functional attributes, which are included in the design drawing. The drawing reading unit 710 (see FIG. 7) may identify entities in the design drawing and then determine completeness, such as whether lines are properly connected between the entities. When necessary, a manager may further provide a complementary interface (not illustrated) for manually complementing a necessary portion.

The attribute assigning unit 720 (see FIG. 7) may assign an identifier to each read entity and each of the input and output terminals of the entity. For example, in FIGS. 3A (300a) and 3B (300b), for identification, each entity and the input and output terminals of each entity may be assigned identification numbers such as S1 (312a, 312b), S2 (314a, 314b), P1 (322a, 322b), P2 (332a, 332b), P3, and L1 (316a, 316b) or entity names such as tank A (310), pump A (320), pump B (330), A water level meter H (311), A water level meter L (313), pump C (340), tank B (350), B water level meter H (351), and B water level meter L (353).

The system unit synthesizing unit 730 may perform synthesis in units of a system where a common cause is to be traced. As an embodiment, the system unit synthesizing unit 730 may perform synthesis with FIGS. 3A and 3B, and in this case, the first project layer generating unit 742 may generate a physical layer 500 (see FIG. 5) by automatically connecting S1 (312a, 312b), S2 (314a, 314b), P1 (322a, 322b), P2 (332a, 332b), and L1 (316a, 316b) that are assigned the same identification number.

Also, when a new drawing (300b) including P3 (342) is read from the drawing reading unit 710, the system unit synthesizing unit 730 may generate a physical layer by automatically connecting a design drawing added through the first project layer generating unit 742.

Also, when a design drawing of a logical function as illustrated in FIG. 4 is read through the drawing reading unit 710, the integrated drawing generating unit 740 may generate a logical layer 400 (see FIG. 4) through the third project layer generating unit 746.

When the corresponding same entities 500a and 340c are respectively in the physical layer 500 (see FIG. 5) generated by the first project layer generating unit 742 and the logical layer 400 (see FIG. 5) generated by the third project layer generating unit 746, the integrated drawing generating unit 740 may hierarchically map the corresponding entities.

Referring to FIG. 5, the pump C 340 in the physical layer 500 and the pump C 340c in the logical layer 400 may be assigned an identification name "pump C" designating the same entity and thus may be matched and connected to each other. The logical layer 400 may further describe logical elements (341c) inside the "pump C". Likewise, S1 (312c), S2 (314c), and L3 (316c) may be matched to the corresponding configurations respectively.

An integrated drawing display unit 750 may illustrate the integrated drawing on a display, and when a failure occurs in a particular entity, the integrated drawing display unit 750 may further display the path of a fault through the entity. Also, when the pump C 340 is toggled in the physical layer 500 (see FIG. 5), the integrated drawing display unit 750 may hierarchically display the pump C 340c in the corresponding logical layer 400 (see FIG. 5).

Figure 6:
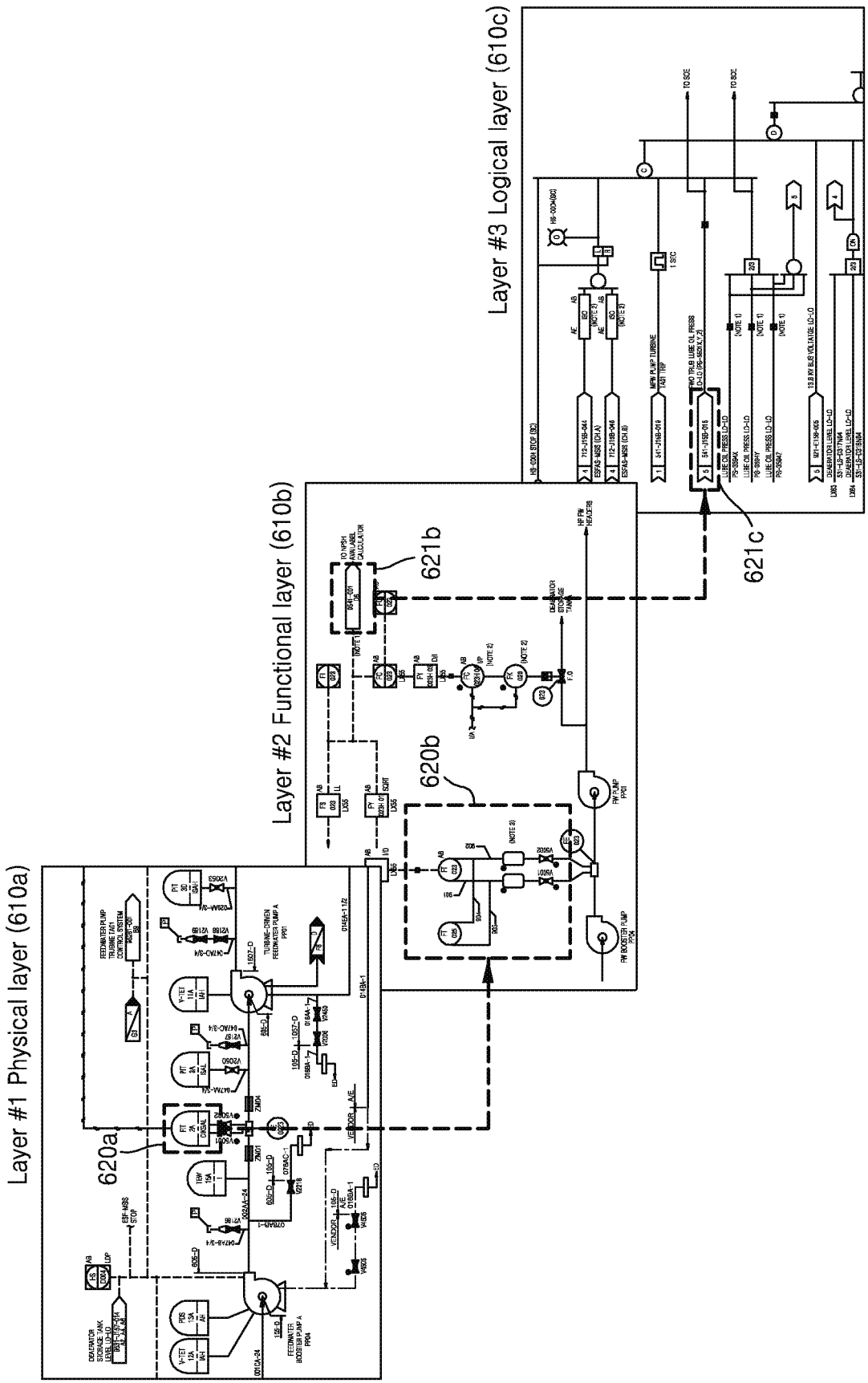
FIG. 6 illustrates an example of an integrated drawing where a physical layer, a functional layer, and a logical layer are all represented, as an example embodiment of the present disclosure.

FIG. 6 illustrates an example of an integrated drawing including all of a physical layer, a functional layer, and a logical layer, as an example embodiment of the present disclosure.

When there is a second project layer 610b as a functional layer corresponding to a first entity 620a in a first project layer 610a as a physical layer, a configuration 620b corresponding to the first entity 620a may be displayed in the second project layer 610b.

When there are a second entity 621b in the second project layer 610b as a functional layer and an entity corresponding thereto in a third project layer 610c as a logical layer, a configuration 621c corresponding to the second entity 621b may be displayed in the third project layer 610c.

Figure 8:
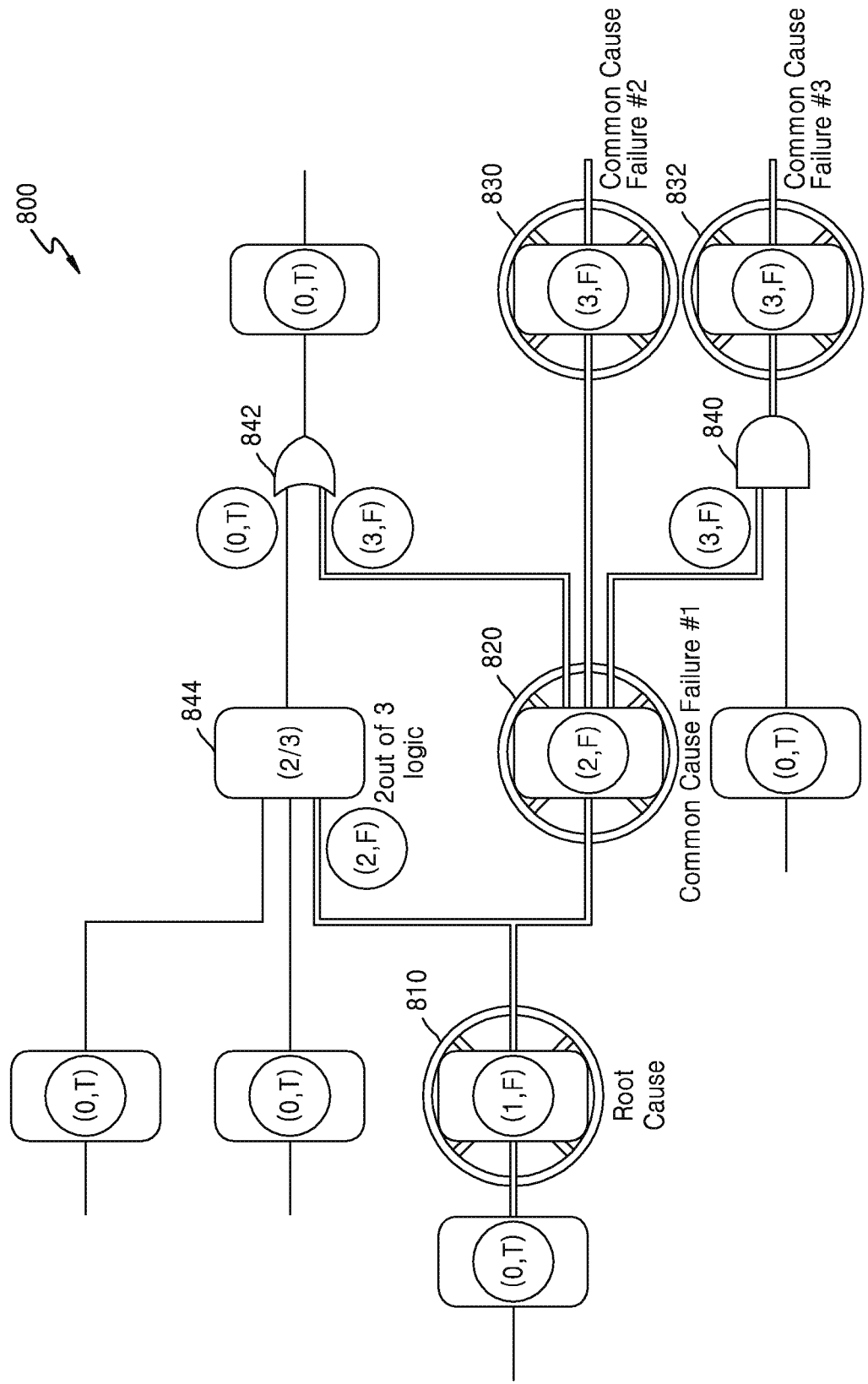
FIG. 8 illustrates an example of detecting a fault propagation process by using an internal tracer, as an example embodiment of the present disclosure.

FIG. 8 illustrates an example (800) of illustrating a fault propagation path in an integrated drawing by using an internal tracer, as an example embodiment of the present disclosure.

The internal tracer may be a virtual memory element and may be implemented to display, in the integrated drawing, a fault propagation path and the availability/unavailability of each entity located on the fault propagation path through information obtained while moving in the integrated drawing.

As an example embodiment of the present disclosure, the useful attribute of Petri-Net may be used to facilitate identification between internal tracers. The attributes of Petri nets were used to distinguish the availability/unavailability of entities, an entity of the integrated drawing was used as a place of Petri-Net, and a line connecting entities was used in the same way as the concept of Arc of Petri-Net. Also, the boundary between entities may be divided into a virtual boundary "Transition" like Petri-Net, and this boundary may include a condition that may exceed the boundary.

An example of detecting a fault propagation path by using an internal tracer in an integrated drawing will be described with reference to FIG. 8.

In FIG. 8, when a failed entity is selected, the entity may have the following internal tracer (1, F) (810). In a next operation, integer type information may be added with 1, and true/false type information may not change and thus carry fault information "(2, F) (820)" of the entity. In the same way, a common failure of the next operation entity may occur in two places 830 and 832, and it may be detected that (3, F) (830, 832) may be detected for each entity. The internal tracer may be used to detect a fault propagation path as (1, F), (2, F), and (3, F), and (1, F) (810) may be detected as a fault cause (root cause). Thereafter, it may be possible to determine whether the fault cause has propagated (2, F) (820) and (3, F) (830, 832).

Referring to FIG. 8, an X mark may be displayed (810, 820, 830, 832) to indicate that each entity between the internal tracers of a initial value (0, T) is unavailable, and logic gates such as AND (840), OR (842), and "2 out of 3" logic (844) may be between the internal traces of the initial value but may not be marked as unavailable. That is, all entities passed by the internal tracer may be determined to be unavailable until an operation of the internal tracer ends or a stage of waiting for an operation occurs.

More particularly, a process of tracing a common fault cause or detecting a fault propagation path will be described below.

A method for starting an operation may be as follows. The internal tracer may include state information representing an available state or an unavailable state of each entity in the integrated drawing. The internal tracer may carry true/false type information "True (T) or False (F)" and integer type information "I" and may operate a logic gate as true/false type information and operate procedure progress and end as integer type information.

When i>0, the true/false type information may have F, and when i≤0, the true/false type information may have T. Also, the integer of the internal tracer including "T" output to the output terminal may always be set to "i=0". This may initialize the information of the internal tracer to wait for the next operation.

A method of performing the operation may be as follows. The information of the entity selected for the first time for being failed or being estimated as a fault cause in the integrated drawing may be (i=1, F) and may be denoted as a fault cause (root cause) 810. When output to the input terminal, "i" may be operated as i−1, and when output to the output terminal, "i" may be operated as i+1. An input terminal without a value may have a value of (0, T). When a true/false type F is output, the highest i value among the input values may be selected as an integer type.

A method of ending an operation may be as follows. When i=0 in the state information and the true/false type of the input information is not F, the operation may be ended.

Figure 9A:
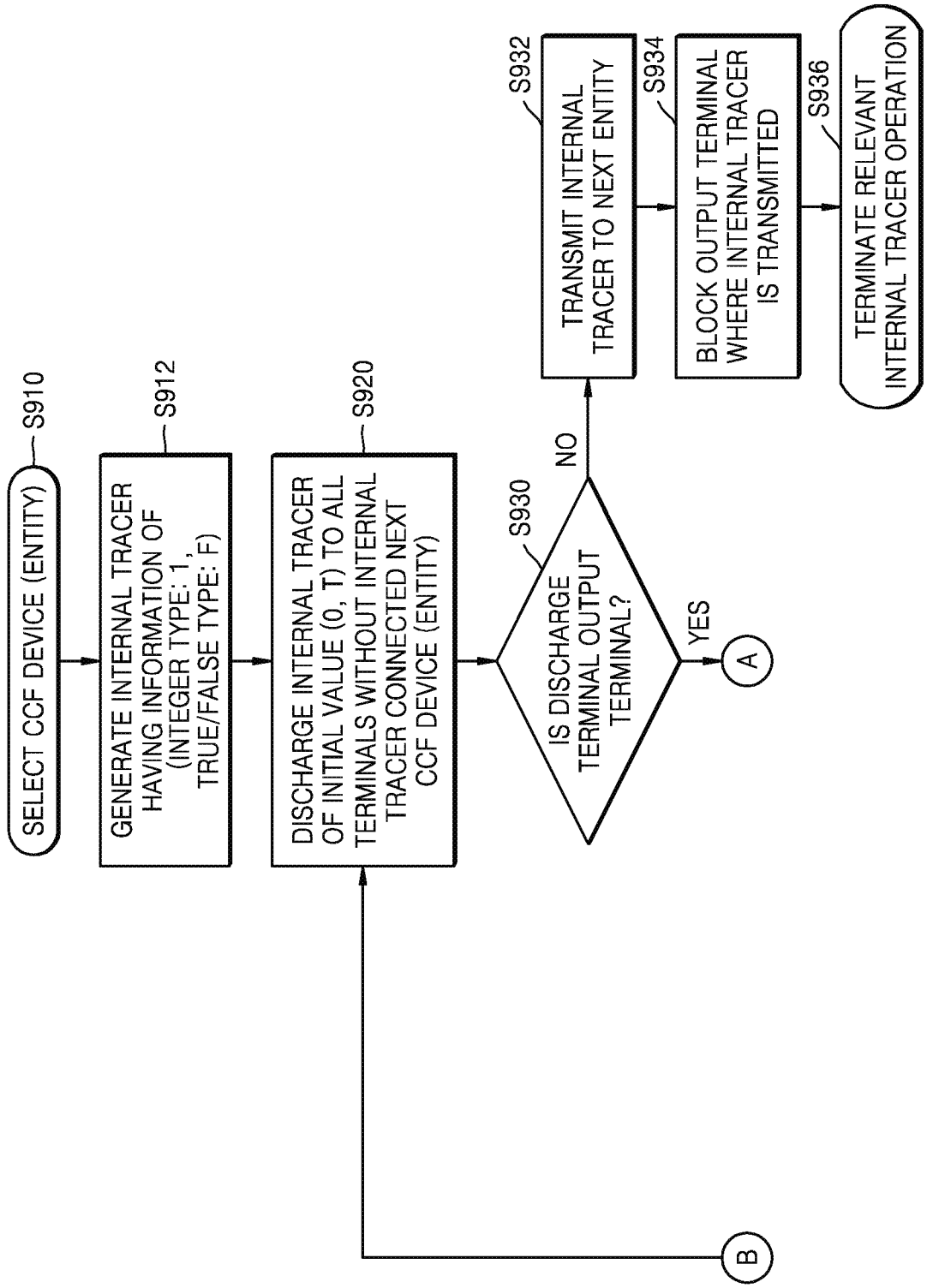
FIGS. 9A and 9B illustrate a flowchart for detecting a fault propagation process in an integrated drawing by using an internal tracer, as an example embodiment of the present disclosure.
Figure 9B:
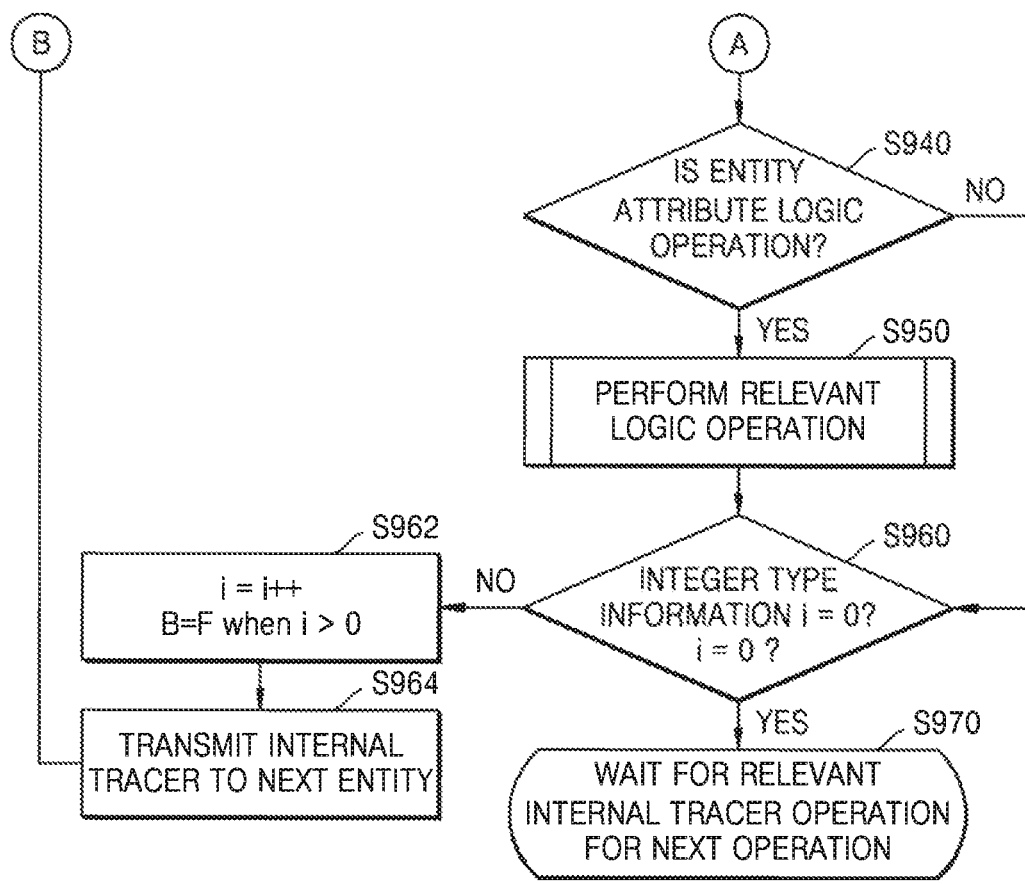

FIGS. 9A and 9B illustrate flowcharts of a method of tracing a common cause failure in an integrated drawing, as an example embodiment of the present disclosure.

Referring to FIG. 9A, an entity that fails or is estimated as failing may be selected in the integrated drawing (S910). Then, an internal tracer having information of (i, F) may be generated (S912).

Next, an operation of discharging an internal tracer of an initial value (0, T) to all terminals without an internal tracer connected next a CCF device (entity) may be performed (S920). Here, a terminal may refer to a point where each entity and an arc contact, a terminal connected to the arc from the entity will be referred to as an output terminal, and a terminal connected to the arc from the entity will be referred to as an input terminal. This may be determined at the time of producing the integrated drawing to determine a direction in which the internal tracer progresses.

It may be determined whether the discharge terminal is the output terminal (S930). When the discharge terminal is not the output terminal, an individual internal tracer may be transmitted to the next entity in the integrated drawing, the output terminal transmitted to the individual internal tracer may be blocked, and then the operation of the individual internal tracer may be ended (S932, S934, S936).

It may be determined whether the discharge terminal is the output terminal (S930). Referring to FIG. 9B, when the discharge terminal is the output terminal, it may be determined whether the attribute of the entity is a logic operation. When the attribute of the entity corresponds to a logic operation, a corresponding logic operation may be performed (S940, S950). When the attribute of the entity is not a logic operation, integer type information may be identified (S940, S960). When i=0, the internal tracer information may be set to the initial value (0, T) to wait for a next operation (S970). When i>0, the value of "I" may be increased by 1, the internal tracer may be transmitted to the next entity (S962, S964) and then a line where the internal tracer is transmitted may be blocked. Thereafter, returning to an operation of discharging the internal tracer of the initial value (0, T) to all terminals without an internal tracer connected next the CCF device (entity), the operation of the internal tracer may be ended or the procedure may be repeated until waiting for the initial value for the next operation.

Also, in the case of a logic gate in the integrated drawing, it may be treated as an entity and it may be an entity assigned the attribute of logic and thus the logic of the corresponding gate should be implemented. In this case, because the entity implementing the logic is not related to the availability/unavailability of the device, it may not correspond to the determination of the availability/unavailability of the entity. The availability/unavailability determination may determine that the entity between the internal tracers with an initial value is unavailable. In this case, the internal tracer information of the entity may have integer type information of 1 or more. Here, because the logical logic is replaced by the place concept, it may be treated as an entity when operating the internal tracer; however, because it is not a concept indicating where the device is available or unavailable, it may be excluded from the indication of unavailability as described above.

Figure 10:
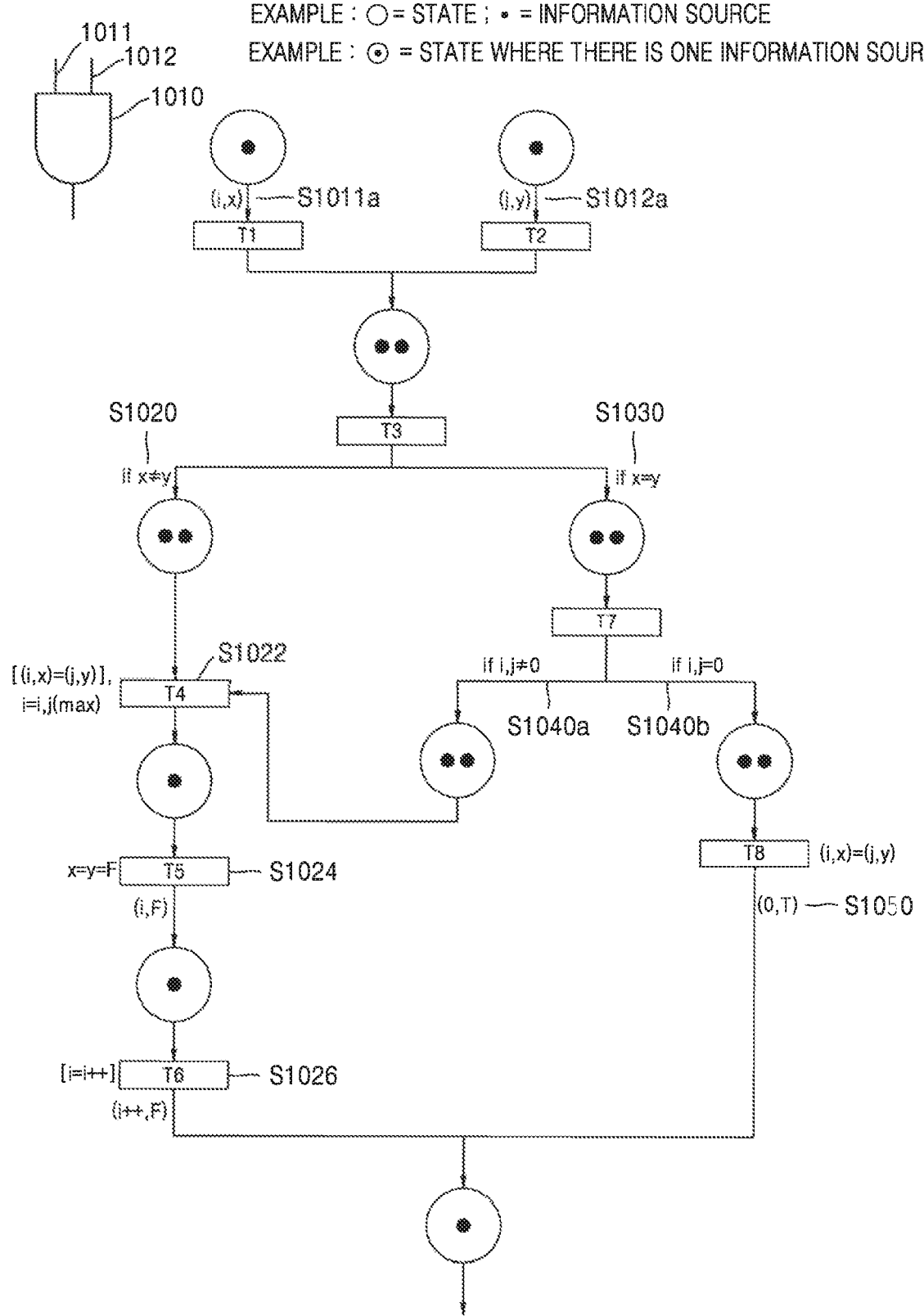
FIG. 10 illustrates an example of using an internal tracer according to a predetermined operation performing method in an AND logic gate, as an example embodiment of the present disclosure.

FIG. 10 illustrates an example of using an internal tracer according to a predetermined operation performing method in an AND logic gate, as an example embodiment of the present disclosure.

In an example embodiment of the present disclosure, an example of an AND gate 1010 having two input terminals 1011 and 1012 will be described. When internal tracers of (i, x) (S1011a) and (j, y) (S1012a) are input through the respective input terminals, if true/false type information of two internal tracers is not the same (S1020), the internal tracer of the greater value among the integer type information of each internal tracer may be selected (S1022), the true/false type information of the internal tracer may be changed into F (S1024), "1" may be added to the integer type information (S1026), the result may be output to the next entity, and the operation may be continued.

When the true/false type information matches (S1030), it may be determined whether i or j is "0", and when it is not "0" (S1040a), the procedure described above may be followed (S1022 to S1026). When i and j are all "0" (S1040b), because they are all an initial value, the internal tracer of the initial value may be output to the next entity to wait for a next operation.

When an entity is selected as a failed device, an internal tracer may be received from an adjacent entity connected to the entity to select whether to continue to transmit the internal tracer to the next entity or whether to end the operation. A procedure (S1050) of discharging an internal tracer of an initial value (0, T) to all terminals without an internal tracer connected next the CCF device (entity) may be an operation of generating a new internal tracer to an input terminal having no internal tracer among a plurality of input terminals for calculation of an internal tracer. The initial value (0, T) may be output to all the terminals without an internal tracer connected to one entity, and the operation of the internal tracer may be ended when the output terminal is the input terminal.

Thereafter, when a logical operation is to be performed, a logic operation may be performed; and when not, it may be determined whether the integer type information is an initial value. When it is the initial value (0, T), it may wait for a next operation. When it is not (0, T), it may pass the internal tracer to the next entity and return to generate an internal tracer with an initial value (0, T) at a terminal without an internal tracer among the terminals connected to the entity. This operation may be repeated until all the internal tracers wait for an operation with an initial value for a next operation or end the operation.

The entity availability/unavailability determination may determine that the entity between the internal tracers with an initial value is unavailable. In this case, the internal tracer information of the entity may have integer type information of 1 or more. Here, because the logical logic is replaced by the place concept, it may be treated as an entity when operating the internal tracer; however, because it is not a concept indicating where the device is available or unavailable, it may be excluded from the indication of unavailability.

As an example embodiment of the present disclosure, a method and apparatus for tracing a common cause failure in an integrated drawing may help safety analysis in power plant design by analyzing a common cause failure in real time and may also help safe operation of a nuclear power plant by accurately providing common cause failure information even with respect to a device failure that may occur at any time in the power plant.

Also, by automatically detecting a cause of a fault and a fault propagation path in the integrated drawing by using the internal tracer, it may be possible to detect and manage the availability/unavailability information of the entities in the fault propagation path in real time.

As an example embodiment of the present disclosure, an integrated drawing producing method and apparatus for common cause tracing may be applied as an operation support system helping safe operation of an operator to all nuclear power plants currently operating in the country and may obtain not only the commercial benefits but also the effect of promoting the company's technology through operating nuclear power plant support services or research services. Also, because the present disclosure may also be applied to the export-type APR1000 nuclear power plant based on the APR1400 and OPR1000 exported to the UAE, it may be expected to bring potential benefits to future nuclear power export.

Each embodiment of the present disclosure may also be implemented in the form of a computer-readable recording medium including computer-executable instructions such as program modules executed by a computer. The computer-readable recording medium may be any available medium accessible by a computer and may include all of volatile or non-volatile mediums and removable or non-removable mediums. Also, the computer-readable recording medium may include all of computer storage mediums and communication mediums. The computer storage mediums may include all of volatile or non-volatile mediums and removable or non-removable mediums that are implemented by any method or technology to store information such as computer-readable instructions, data structures, program modules, or other data. For example, the communication mediums may include any information transmission medium and may include other transmission mechanisms or other data of modulated data signals such as carriers, computer-readable instructions, data structures, or program modules.

Although the method and system of the present disclosure have been described with reference to particular embodiments, some or all of those elements or operations may be implemented by using a computer system having a general-purpose hardware architecture.

The foregoing is illustrative of embodiments of the present disclosure, and those of ordinary skill in the art will readily understand that various modifications may be made therein without materially departing from the spirits or features of the present disclosure. Therefore, it is to be understood that the embodiments described above should be considered in a descriptive sense only and not for purposes of limitation. For example, elements described as being combined may also be implemented in a distributed manner, and elements described as being distributed may also be implemented in a combined manner.

Therefore, the scope of the present disclosure is defined not by the detailed description of the embodiments but by the following claims, and all changes or modifications derived from the meaning and scope of the following claims and equivalent concepts thereof should be construed as being included in the scope of the present disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of tracing a common cause failure in an integrated drawing, the method comprising:
   distinguishing shapes of entities in at least one design drawing and assigning an attribute to each of the entities;
   synthesizing the entities assigned the attribute in the at least one design drawing in units of a system where a common cause is to be traced;
   generating an integrated drawing with a hierarchical structure by horizontally or vertically interconnecting entities assigned a same attribute in the at least one design drawing; and
   displaying a fault propagation path in the integrated drawing by using an internal tracer,
   wherein the displaying illustrates state information of entities on the fault propagation path, wherein the internal tracer carries integer type information and true/false type information in the form of (i, B), operates a logic gate as true/false type information, and operates procedure, progress, and end as integer type information, the true/false type information is represented by B, which is represented by True (T) or False (F), the integer type information is represented by i, the true/false type information is F when i>0, and the true/false type information is T when i≤0.

2. The method of claim 1, wherein the internal tracer includes state information of each entity in the integrated drawing, and the state information represents an available state and an unavailable state.

3. The method of claim 1, wherein the internal tracer is discharged to all terminals in the integrated drawing, and when a discharge terminal is an output terminal, a value of the integer type information is increased by h and then the internal tracer is transmitted to a next entity and a line where the internal tracer is transmitted is blocked.

4. The method of claim 1, wherein an input/output terminal where an internal tracer having F as true/false type information is passed is closed.

5. An apparatus for tracing a common cause failure in an integrated drawing, the apparatus comprising:
an attribute assigning unit distinguishing shapes of entities in at least one design drawing and assigning an attribute to each of the entities;
a system unit synthesizing unit synthesizing the entities assigned the attribute in the at least one design drawing in units of a system where a common cause is to be traced;
an integrated drawing generating unit generating an integrated drawing with a hierarchical structure by horizontally or vertically interconnecting entities assigned a same attribute in the at least one design drawing; and
an integrated drawing display unit displaying a fault propagation path in the integrated drawing by using an internal tracer,
wherein the integrated drawing display unit illustrates state information of the entities on the fault propagation path, wherein the internal tracer carries integer type information and true/false type information in the form of (i, B), operates a logic gate as true/false type information, and operates procedure, progress, and end as integer type information, the true/false type information is represented by B, which is represented by True (T) or False (F), the integer type information is represented by i, the true/false type information is F when i>0, and the true/false type information is T when i≤0.

6. The apparatus of claim 5, wherein the internal tracer includes state information of each entity in the integrated drawing, and the state information represents an available state and an unavailable state.

7. The apparatus of claim 5, wherein the internal tracer is discharged to all terminals in the integrated drawing, and when a discharge terminal is an output terminal, a value of the integer type information is increased by 1, and then the internal tracer is transmitted to a next entity and a line where the internal tracer is transmitted is blocked.

8. The apparatus of claim 5, wherein an input/output terminal where an internal tracer having F as true/false type information is passed is closed.

* * * * *